United States Patent
Marietta et al.

(10) Patent No.: US 6,678,773 B2
(45) Date of Patent: Jan. 13, 2004

(54) BUS PROTOCOL INDEPENDENT METHOD AND STRUCTURE FOR MANAGING TRANSACTION PRIORITY, ORDERING AND DEADLOCKS IN A MULTI-PROCESSING SYSTEM

(75) Inventors: Bryan D. Marietta, Austin, TX (US); Daniel L. Bouvier, Austin, TX (US); Robert C. Frisch, Westford, MA (US)

(73) Assignees: Motorola, Inc., Schaumburg, IL (US); Mercury Computer Systems, Inc., Chelmsford, MA (US)

( * ) Notice: Subject to any disclaimer, the term of this patent is extended or adjusted under 35 U.S.C. 154(b) by 484 days.

(21) Appl. No.: 09/758,855

(22) Filed: Jan. 11, 2001

(65) Prior Publication Data

US 2001/0032282 A1 Oct. 18, 2001

Related U.S. Application Data (60) Provisional application No. 60/175,856, filed on Jan. 13, 2000.

(51) Int. Cl.[7] .......................... G06F 12/00; G06F 13/22
(52) U.S. Cl. ................. 710/200; 710/220; 710/241; 710/242; 710/243; 710/244
(58) Field of Search ................. 710/200, 220, 710/241, 242, 243, 244

(56) References Cited

U.S. PATENT DOCUMENTS

| | | | |
|---|---|---|---|
| 5,835,739 A | 11/1998 | Bell et al. | 395/308 |
| 5,870,560 A * | 2/1999 | Zulian | 709/225 |
| 5,930,485 A | 7/1999 | Kelly | 395/292 |
| 5,960,179 A | 9/1999 | Hagersten | 395/287 |
| 6,141,692 A | 10/2000 | Loewenstein et al. | 709/234 |
| 6,185,647 B1 * | 2/2001 | Shibuya | 710/107 |
| 6,295,553 B1 * | 9/2001 | Gilbertson et al. | 709/207 |
| 6,411,236 B1 * | 6/2002 | Kermani | 341/141 |

OTHER PUBLICATIONS

U.S. Provisional application 60/175,856, filed by Bryan D. Marietta on Jan. 13, 2000, entitled Rio Bus Protocol.

* cited by examiner

*Primary Examiner*—Tim Vo
(74) *Attorney, Agent, or Firm*—Robert L. King (57) ABSTRACT

A multi-processing system (50) utilizes an interconnect fabric (59) for coupling endpoint devices (52, 54, 56, 66, 67). Bus control functions are managed in a method which is bus protocol independent. Each of the endpoint devices and the fabric function by specific rules to transfer data having a priority. Within the interconnect, higher priority data transfers take precedence of servicing, and for equal priority data the data is serviced first-in, first-out. Requests of endpoint devices that require a response can not be sent at the highest priority. Endpoint devices may not allow the acceptance of data to be contingent on outputting data of equal or lesser priority than the priority of the incoming data. Transaction priority, ordering and deadlocks are efficiently handled without the interconnect fabric needing to implement a set of bus protocol rules. Within the endpoint devices, additional rules related to ordering may be implemented.

20 Claims, 3 Drawing Sheets

BUS PROTOCOL INDEPENDENT METHOD AND STRUCTURE FOR MANAGING TRANSACTION PRIORITY, ORDERING AND DEADLOCKS IN A MULTI-PROCESSING SYSTEM

RELATED APPLICATIONS

This nonprovisional patent application claims a right of priority and the benefit of Provisional U.S. Patent Application Ser. No. 60/175,856 filed Jan. 13, 2000 entitled "Rio Bus Protocol" by Bryan Marietta pursuant to 35 U.S.C. §119(e).

FIELD OF THE INVENTION

The present invention relates to multi-processing systems and, more particularly, to communication bus structures for communicating transactions in a multi-processing system.

BACKGROUND OF THE INVENTION

In data processing and communications systems it is common for a global communication bus to be utilized to connect the various components and modules of the system. Such components include, inter alia, processors, memory controllers and peripheral controllers for controlling peripherals such as keyboards, Small Computer System Interface (SCSI) connections and Ethernet connections. In addition, a bus arbitration unit must be connected to common communication bus for controlling accesses to the bus. The implementation of such systems are typically specific to one type of bus arbitration scheme and one type of bus protocol.

Figure 1:
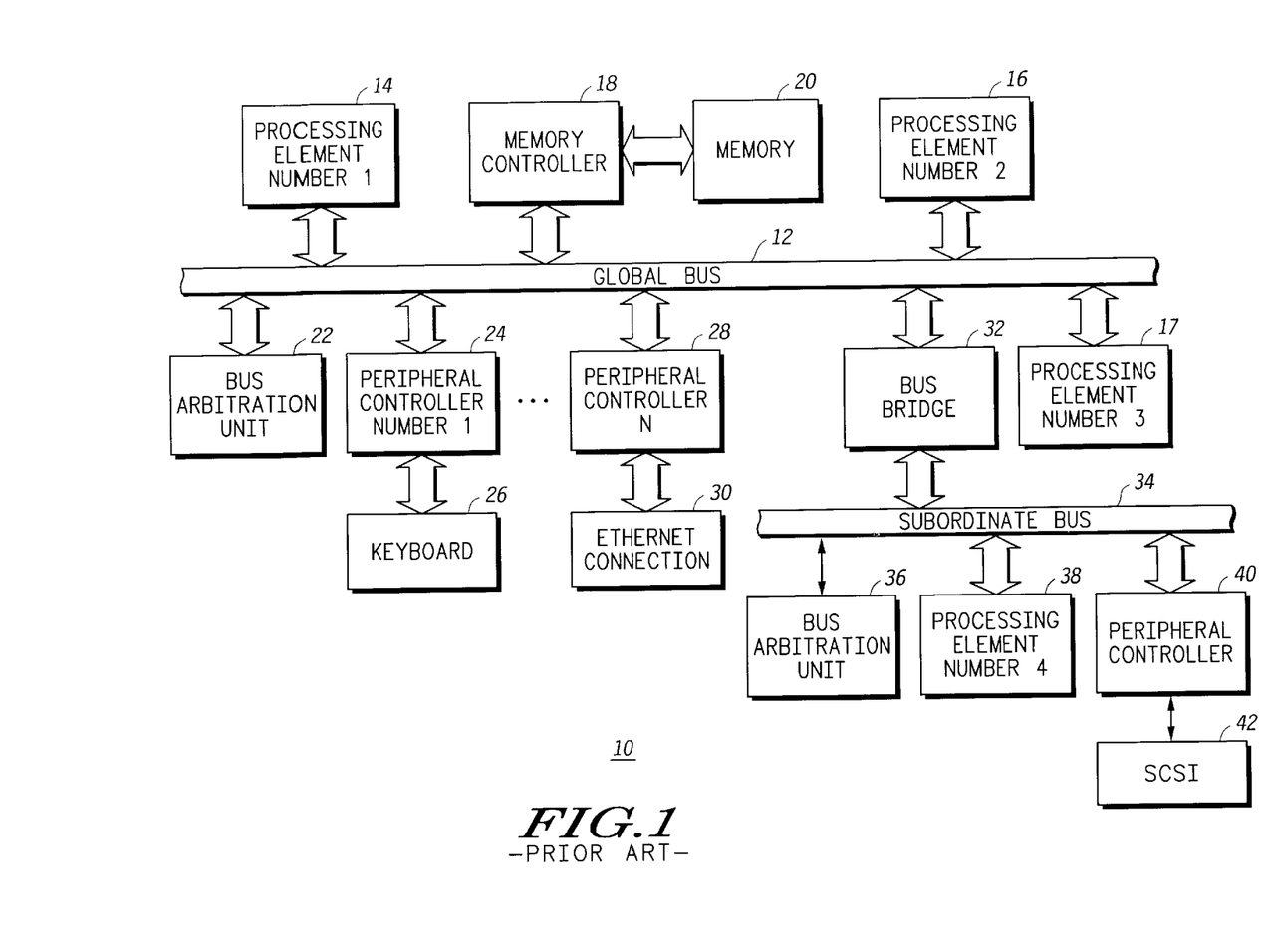
FIG. 1 shows a block diagram of a known bus structure for a multi-processing system.

Shown in FIG. 1 is a data processing system 10 which is representative of the present state of multi-processing systems. A global bus 12 is coupled to a first processing element 14, to a second processing element 16 and to a third processing element 17. A memory controller 18 is also coupled to global bus 12. Memory controller 18 is separately coupled to a memory 20. A bus arbitration unit 22 is coupled to global bus 12. A number of peripheral controllers including a first peripheral controller 24 through an Nth peripheral controller 28, where N is an integer, is coupled to global bus 12. A keyboard 26 is coupled to peripheral controller 24, and an ethernet connection 30 is coupled to peripheral controller 28. A bus bridge 32 is shown coupled between global bus 12 and a subordinate bus 34. A second bus arbitration unit 36 is coupled to the subordinate bus 34. Both a fourth processing element 38 and a peripheral controller 40 are coupled to subordinate bus 34. Peripheral controller 40 is coupled to a SCSI port 42.

Bus arbitration unit 22 functions to control which of the numerous potential bus masters coupled to global bus 12 will have control of the global bus 12 and for how long. The bus arbitration function for global bus 12 is centralized within bus arbitration unit 22. Numerous bus arbitration techniques exist. A typical feature of all known forms of bus arbitration unit 22 is that bus arbitration unit 22 must contain the logic circuitry associated with the bus protocol which is selected for global bus 12. Each of the peripherals from global bus 12 must be appropriately specified to a common defined bus specification or protocol. Each bus protocol may be unique in the way operations, such as a data read and a data write, are ordered. Protocols are also specific as to how requests for servicing are handled in relation to how responses to such requests are made. The implementation of a specific protocol in bus arbitration unit 22 results in several disadvantages. Firstly, once a bus protocol for global bus 12 is chosen and implemented, any additional peripheral units which are to be added to the system for using that bus must implement that bus protocol in order to be compatible in the system. This constraint necessitates the addition of a bus bridge such as bus bridge 32 should any additional peripherals using a different bus protocol be added to the system. Additionally, another bus arbitration unit 36 is required to be added to the system should multiple peripherals, such as processing element 38 and peripheral controller 40, be coupled to the subordinate bus 34. These disadvantages plus the extra circuitry required in each of the peripherals and the bus arbitration units 22 to implement a selected bus protocol, such as the well known standard bus protocols PCI (Peripheral Component Interconnect) or VME, significantly add to the cost of a multi-processing system as well as increase the physical size of the system.

Other data processing systems having multiple bus masters are known in which a central positioned interconnect is used having multiple inputs for communicating simultaneously with each bus master. In such systems, the bus arbitration function and the bus protocol logic must be implemented in the interconnect device and thus a large amount of dedicated circuitry is required in addition to bus protocol logic in each bus master. If multiple interconnect devices are used to distribute the bus distribution functionality, the bus protocol logic circuitry has to be implemented in each interconnect device. Additionally, such systems are susceptible to reaching a deadlock condition where the interconnect cannot newly received transactions because pending transactions cannot be completed. There exists therefore a need for a simpler and more flexible method and mechanism for implementing bus transactions in a multi-processing system capable of proper handling of transaction ordering while avoiding deadlock conditions.

DETAILED DESCRIPTION OF THE DRAWINGS

Figure 2:
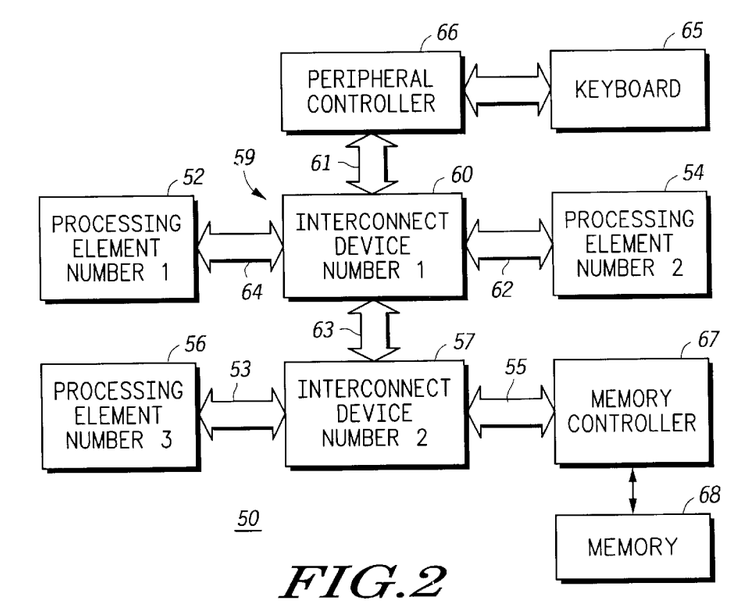
FIG. 2 illustrates in block diagram form a multi-processing system which utilizes the present invention.

FIG. 2 illustrates in block diagram form an exemplary multi-processing system 50 having a first processing element 52, a second processing element 54 and a third processing element 56. In this context, processing element means any endpoint device capable of initiating transactions, and in general, an endpoint device is any device from which a transaction originates or terminates. The present invention may be utilized in a system with any number of processing elements and FIG. 2 is by way of example only. Processing elements 52 and 54 are inter-coupled via a fabric 59. The term fabric is used to refer to the general interconnect functionality which exists between the endpoint devices. Therefore, it should be understood that fabric 59 is distributed within system 50. In the illustrated form of FIG. 2, fabric 59 will be represented having one or more central devices which function in combination with bus interface circuitry within each endpoint device.

However, fabric 59 could also be implemented with no devices physically connected between the endpoint devices other than a physical bus. In such a form, all of the interconnect functionality of fabric 59 is implemented in the form of bus interface circuitry located within each of the endpoint devices.

It should be well understood that each of processing elements 52, 54 and 56 may be a data processor such as a microprocessor or may be some other type of device which has the function of processing information, such as a digital signal processor, a graphics processor, etc. Fabric 59 has a first interconnect device 60 and a second interconnect device 57. Interconnect device 57 is externally coupled via three separate buses, buses 53, 55, and 63, respectively. Interconnect device 60 is externally coupled via four separate buses, buses 61, 62, 63 and 64, respectively. Processing element 52 is coupled to interconnect device 60 via bus 64. Processing element 54 is coupled to interconnect device 60 via bus 62. Interconnect device 57 is coupled to interconnect device 60 via bus 63. A peripheral controller 66 is coupled to interconnect device 60 via bus 61. A keyboard 65 is coupled to peripheral controller 66. Interconnect device 57 is coupled to processing element 56 via bus 53. A memory controller 67 is coupled to interconnect device 57 via bus 55. A memory 68 is coupled to memory controller 67.

In operation, multi-processing system 50 functions to permit any of the endpoint devices, such as processing element 52 or memory controller 67, to communicate via interconnect devices 57 and 60. The endpoint devices communicate via fabric 59 to request various action at or from any of the other endpoint devices, such as read and write operations, for example. To accomplish this communication, address information must be communicated as well as other information in an instruction transaction format having various fields. One of the fields is an address which is used by fabric 59 to properly route the transaction. In particular, the fabric 59 is implemented independent of any particular bus protocol so that processing element 52 may implement a first bus protocol, such as PCI, and processing element 54 may implement a second bus protocol, such as VME. This operational method and apparatus is implemented without having to include any circuitry unique to a particular bus protocol within the fabric 59. It should be well understood that multi-processing system 50 is given by way of example only. If desired, a single interconnect device, such as interconnect device 60 may be used. Similarly, a large number of interconnect devices may be implemented as fabric 59 should be viewed as the conduit in multi-processing system 50 which is a bus protocol independent system.

Before further discussing the specific structure of fabric 59, it is important to understand several system functions which fabric 59 must successfully address. A first attribute which fabric 59 must implement is the traditional function of bus arbitration between the various endpoint devices in multi-processing system 50. As previously noted, a portion of this function involved determining which endpoint device should have priority of the bus and successfully implementing the proper behavior associated with the bus timing protocol. Those requirements necessitated that a significant amount of circuitry unique to a predetermined bus protocol be dedicated within a bus arbiter and once dedicated, the system was locked in to requiring endpoint devices which implemented only that chosen bus protocol for use with that bus arbiter. Fabric 59, as will be discussed below, is able to provide a method and structure which manages transaction priorities between the various endpoint devices while remaining independent of specific bus protocols.

To manage transaction priority and remain protocol independent, each endpoint device utilizes a transaction format described further below. The transaction format has a priority field in which all requests and responses have an assigned priority level. Each endpoint device must have priority setting circuitry which operates to assign priority in accordance with a set of rules discussed below. In addition, each endpoint device must have circuitry which can detect the assigned priority of transaction information. Should it be necessary to change a priority assignment to comply with the system rules or otherwise desirable to change a priority assignment, each endpoint should have circuitry which can implement a change in priority assignment. The priority level assigned by the endpoint devices is the only priority information which fabric 59 utilizes. Within fabric 59 there are two rules of operation. Firstly, higher priority data transactions must have the ability to take precedence over lower priority transactions within fabric 59. In low-volume operation, the observance of strict prioritization is not essential, but when higher volume activity occurs, this rule should be strictly observed. Further discussion of the operation of this rule is provided below. Secondly, fabric 59 must observe the rule that among transactions having the same assigned priority level of service, the oldest received transaction is always sent first. This rule is a first-in, first-out (FIFO) policy and is readily implemented in hardware.

A second attribute is a condition known in the art as "deadlock" and which must be avoided. Deadlocks may occur if a dependency loop exists. A dependency loop is a situation where a loop of buffering devices is formed, in which forward progress at each buffering device is dependent upon progress at the next buffering device. If no device in the loop can make progress, then the system has deadlocked. When deadlock occurs, fabric 59 is not able to successfully handle and route new requests for information because the fabric cannot deliver response information from previous requests. For example, assume that processing element 52 issues successive requests to processing element 54 for data which processing element 54 has. Concurrently, assume that processing element 54 is also requesting a number of successive requests to processing element 52 for other data. If processing element 54 is concurrently responding to processing element 52 by transferring data from previous requests, it should be apparent that a large amount of data transfer activity is occurring within fabric 59. Should fabric 59 fill with requests, a dependency loop forms and it will not be possible to move responses through the fabric 59 to complete the requests.

To prevent deadlock, the following rules should be observed within multi-processing system 50. Firstly, request transactions that require a response may never be sent at the highest priority level. That rule exists because response transactions from a destination endpoint device must be able to pass ahead of request transactions in the fabric 59. That means that a response transaction must be issued at a higher priority than the associated request transaction. Secondly, endpoint devices may not allow the acceptance of transaction information to be contingent on outputting transaction information of equal or lesser priority than the priority of transaction information to be received. Thirdly, an endpoint device must not allow the issue of a response transaction to be blocked by output request transactions. Therefore, each endpoint device must be programmed to allow response transactions to pass request transactions of the same priority. That is, an endpoint device must be able to increment a response transaction priority in order to make forward progress. This rule may be implemented in a number of embodiments. In one form, the deadlock avoidance may be implemented as a bypass feature where a highest prioritized transaction must be able to be serviced before lower prioritized transactions when lower prioritized transactions can not make forward progress. The bypass feature can be a hardware re-route around or directly through a priority queue should the priority queue be full for a certain priority level and all higher levels. The bypass feature may also take the form of a promotion to the next higher priority level in a priority queue assuming there is storage capacity at the next higher level. Such priority promotion would follow the rule of promoting or bypassing response transactions before request transactions of a same priority. Additionally, an optional feature may be implemented whereby an endpoint device may continuously retry accepting a received transaction, such retry should be permitted continuously only if the endpoint device is trying to output an information transaction with priority higher than the priority of the received transaction. In all other cases, received information transactions which cannot be immediately accepted must be eventually accepted later.

To prevent deadlock in multi-processing system 50 due to resource limitations, a source endpoint device which has made a request must be able to accept response transactions of all priority levels. To implement this rule, a source endpoint device may retry accepting a response transaction temporarily while it frees up resources used by a previous response transaction.

Yet another function which fabric 59 implements independent of the bus protocol used by any of the endpoint devices is the function of ordering. It should be understood that multi-processing system 50 may be implemented as either an ordered or an unordered system. When implemented as an unordered system, all outstanding transactions from one endpoint device to another endpoint device are completed in an arbitrary order. Conversely, an ordered system requires that all transactions between a source endpoint device and a destination endpoint device be completed in a defined order. Ordered systems place additional implementation constraints on both endpoint and intermediate devices. In order to implement bus protocol independent transaction ordering within system 50, several basic ordering rules regarding how information requests are made by one endpoint device to another endpoint device. These rules must be implemented by each endpoint device and are typically implemented in conjunction with software control of that endpoint device.

An example of an ordering rule set is provided below which applies to information flows involving a request of another endpoint device. In this discussion, assume that the word 'flow' means a stream of related transactions and there is no contextual relationship between different flows. First, all write requests from a source endpoint device must complete in the order they are issued. This means that a write request transaction cannot pass an earlier received write request transaction within the fabric or within the destination endpoint device. Therefore, all write requests from a source endpoint device must be issued at the same priority level within a particular request flow. That is not to say that write request priorities may not differ between different endpoint devices as long as write requests have the same priority of service within the same request flow from a source endpoint device. Second, read requests at a destination endpoint device must first push ahead any and all preceding write requests before the read request is serviced. That is, a read request transaction can not pass a write request transaction in order of servicing at a destination endpoint device. Therefore, read requests from a source endpoint device must be issued at the same or a lower priority of service as write requests within any particular request flow. Response transactions from a destination endpoint device may be returned to the source endpoint device in any order. That is to say that response transactions can pass other response transactions within fabric 59. Therefore, in responding to a request, a destination endpoint device must be able to promote response transactions to a priority of service level which is higher than the associated request.

By using the above ordering rules, a bus protocol independent method is implemented in system 50. Fabric 59 does not decode any transaction type, but rather makes all ordering decisions based strictly on a routing address and a priority level. The fabric 59 also does not determine a priority level and does not modify an assigned priority level. Also, different request flows have no ordering rules associated between them for the fabric 59 to keep track of. Similarly, there are no ordering requirements which need to be implemented by the fabric 59 for information requests which are occurring in opposite directions. Completion of an information transfer transaction is not dependent on any third device, but rather is dependent only on operation of the originating endpoint device and the destination endpoint device.

Figure 3:
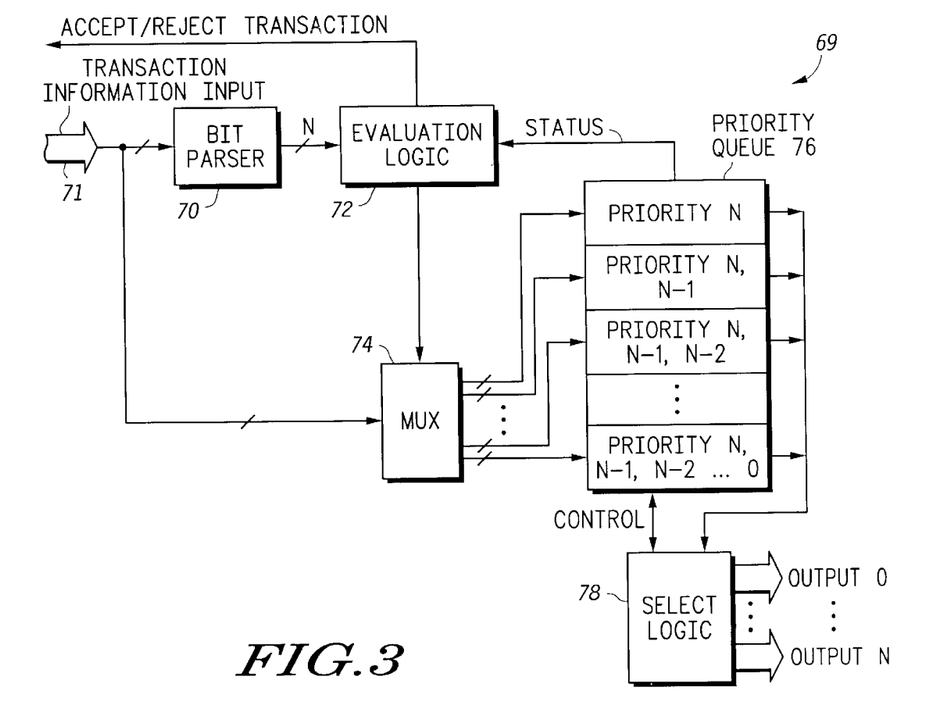
FIG. 3 illustrates in further detail a receive portion of the endpoint and interconnect devices of FIG. 2.

Illustrated in FIG. 3 is an input receive portion 69 which is implemented in the endpoint devices (processing elements 52, 54 and 56, peripheral controller 66 and memory controller 67) and in the interconnect devices 57 and 60 in those implementations in which physical devices are used in the interconnect. Where the interconnect is implemented as a bus without physical devices such as interconnect devices 57 and 60, input receive portion 69 is implemented only in the endpoint devices. A bus 71 is coupled to an input of a bit parser circuit 70 and to an input of a multiplexer (MUX) 74. It should be well understood that bus 71 represents the input portion of each of buses 53, 55, 61, 62 and 64 in multi-processing system 50 of FIG. 2. An output of bit parser 70 provides an N-bit output, where N is an integer, which is connected to a first input of an evaluation logic circuit 72. A first output of evaluation logic circuit 72 is connected to a control input of multiplexer 74. A second output of evaluation logic circuit 72 provides an 'Accept/Reject Transaction' signal which is provided to interconnect device 57. Multiplexer 74 has a plurality of outputs which couple the input of multiplexer 74 to one of a plurality of predetermined prioritized storage areas of a priority queue 76. In the illustrated form, priority queue 76 has a highest priority region for accepting transactions of only priority N. A next highest priority region accepts transactions of priority N and N−1. The lowest priority region accepts transactions of priority N, N−1, N−2 . . . 0, where N is an integer. Priority queue 76 has a plurality of outputs, each provided from a predetermined one of the prioritized regions, connected to a select logic circuit 78. A bi-directional control signal is connected between priority queue 76 and select logic 78. Select logic 78 provides outputs to any one of a plurality of N differing ports.

During operation, information is received via bus 71 in an instruction transaction information format. The information is connected to bit parser 70 which takes the encoded priority information from the received information and provides the priority information to evaluation logic 72. Evaluation logic 72 determines which one of a plurality of priority-designated regions the information should be stored in priority queue 76. Evaluation logic 72 provides a control signal to multiplexer (Mux) 74 which routes the information to the appropriate region of priority queue 76. If the information is successfully stored in priority queue 76, a status priority queue signal is sent from priority queue 76 to evaluation logic 72. Evaluation logic 72 provides an "Accept/Reject Transaction" signal back to the originating endpoint device indicating that the information was successfully received. Select logic 78 is implemented according to the rules above for transaction priority rules for the fabric. In general, information is pulled by select logic 78 from the priority queue 76 based upon both priority and FIFO order. Up to N output ports, where N is an integer, are illustrated at the output of select logic 78 to illustrate that when implemented in the interconnect device the information may go to any one of a plurality of ports which may be implemented in multi-processing system 50. When select logic 78 is implemented in an endpoint device, only one port is typically required. It should be noted that the highest priority N region of priority queue 76 functions as a bypass to enable input receive portion 69 to increase the priority of a transaction where necessary in order to make forward progress due to all of the storage associated with a lower priority region or regions being full.

Figure 4:
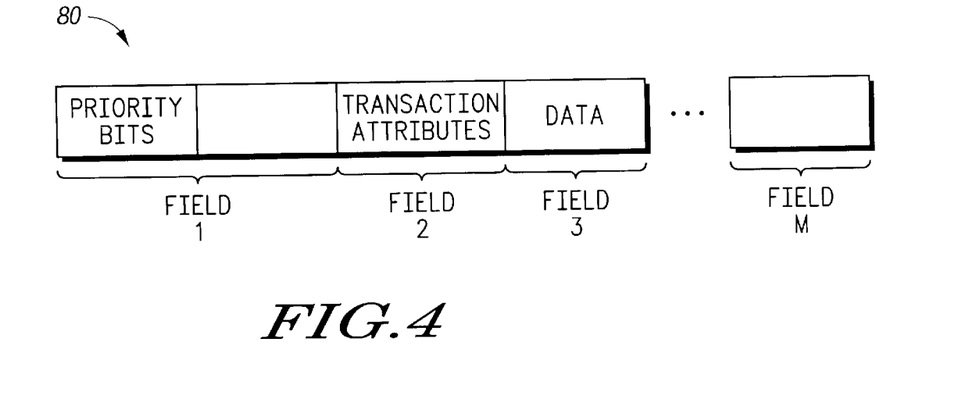
FIG. 4 illustrates in block diagram form a data format for use with the interconnect device of FIG. 2.

Referring to FIG. 4, it can be seen from a transaction information 80 that multi-processing system 50 may use transaction information having any number M of distinct fields of predetermined arbitrary bit size, where M is an integer. The first field comprises a predetermined number of priority bits and other information. In one form, two priority bits may be reserved to provide four distinct levels of priority, but any number of bits may be selected. In the illustrated form, the second field contains a variety of transaction attributes, and the remaining fields contain data. In this context, data may include address and control information.

Figure 5:
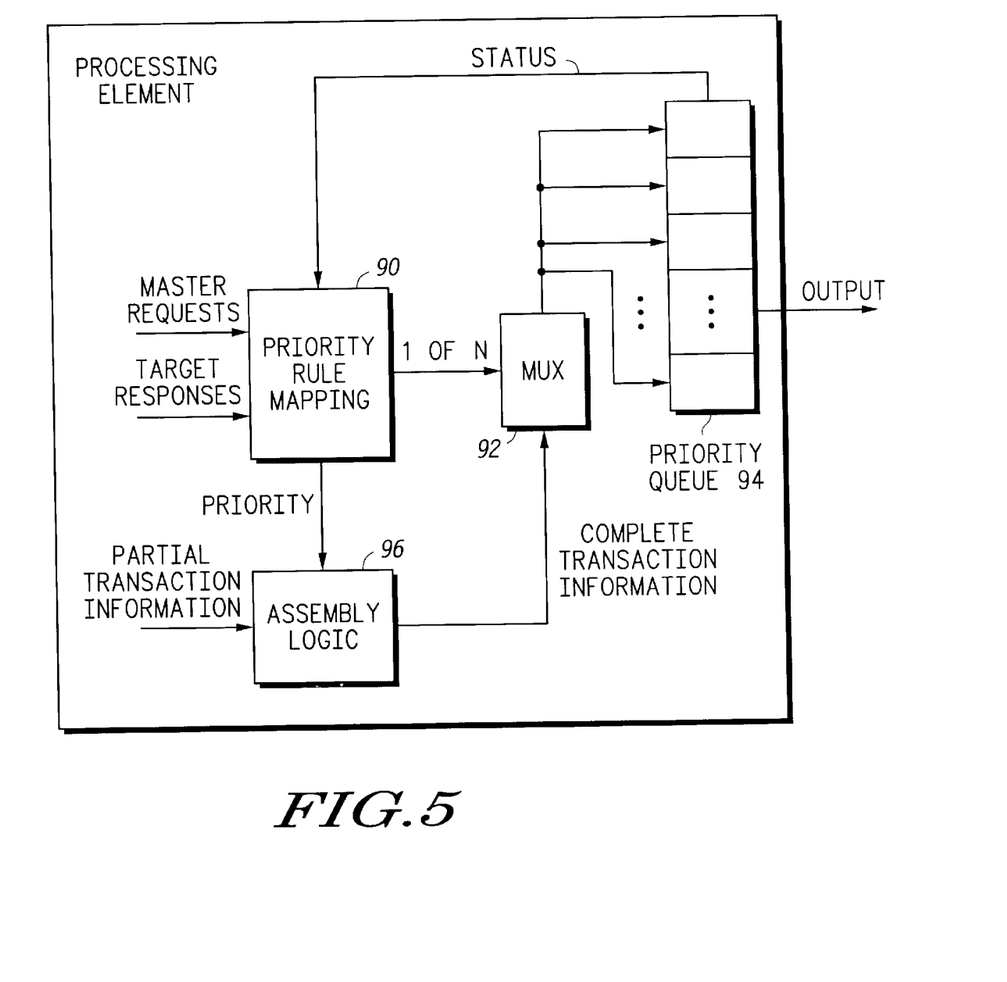
FIG. 5 illustrates in block diagram form a send portion of the endpoint devices of FIG. 2.

Illustrated in FIG. 5 is an example of an output section which is used in any of the endpoint devices. The output section of FIG. 5 and input receive portion 69 of FIG. 3 may be viewed collectively as a bus interface unit. A priority rule mapping circuit 90 has a first input for receiving a plurality of master requests which represent requests from the processing element which priority rule mapping circuit 90 is resident in. Priority rule mapping circuit 90 has a second input for receiving one or more target responses which represent responses to endpoint devices other than the processing element which priority rule mapping circuit 90 is resident in. A first output of priority rule mapping circuit 90 provides a priority signal to an input of an assembly logic circuit 96. Assembly logic circuit 96 has a second input for receiving partial transaction information. Assembly logic circuit 96 functions to combine the priority information from priority rule mapping circuit 90 with the particular transaction information to create the complete transaction information in a predetermined format, such as the information format of FIG. 4. An output of assembly logic circuit 96 is connected to an input of multiplexer 92. A second output of priority rule mapping circuit 90 is connected to a control input of multiplexer 92. An output of multiplexer 92 is connected to one of a plurality of prioritized storage regions of a priority queue 94. Priority queue 94 provides at an output terminal labeled "Output" the contents of priority queue 94 on a highest priority-first basis and within the same priority region on a FIFO basis. Successful storage of each complete transaction information word results in generation of an assertive status signal from the priority queue 94 to the priority rule mapping circuit 90 to indicate that the master request or target response has been successfully loaded for transmitting.

As illustrated for both the transmit circuitry of FIG. 5 and the receive circuitry of FIG. 3, the circuitry associated with the method for managing transaction priority, ordering and deadlocks is greatly simplified from prior multi-processing systems. The fabric 59 is not required to have circuitry which must differentiate between requests and responses. Similarly, the fabric 59 is not required to have circuitry which must differentiate between a read operation and a write operation. Just as significant, the fabric 59, functioning as the interconnect device in the multi-processing system 50 is not required to understand transaction dependencies. Therefore, a large amount of logic and decoding circuitry commonly found in bus protocol arbitration has been removed from the interconnect fabric.

It should be noted that the method and structure taught herein are forward compatible with new devices which may be created and added to the system at some point in the future. Additional system or bus rules may be added without impacting the interconnect functionality. Similarly, additional or modified functionality to the system may be created without modifying the design of fabric 59. There is also flexibility in the multi-processing system 50 to support different transaction ordering rules simultaneously in the same system.

By now it should be apparent that there has been provided a method and apparatus for managing transaction priorities, for managing transaction ordering and for managing deadlocks in a multi-processing system. Various physical implementations of the present invention may be readily utilized. For example, any type of bus peripheral device may be used in multi-processing system 50. Also, it should be well understood that the structure in FIG. 2 may be implemented by substituting the interconnect devices with a global data bus conductor. In such an event, the endpoint devices would function in the same way with respect to the present invention as stated above when interconnect devices (circuitry) are present. It should be well understood that implementation details regarding how endpoint devices communicate will vary with differing interconnect implementations. When a bus conductor is used as the interconnect, the conductor per se will satisfy the two previously mentioned rules required of the interconnect which are the observing of highest priority transactions first and the observance of a FIFO order simply because the bus conductor will transmit what is provided by the endpoint devices. Although queues are illustrated as a storage mechanism in FIG. 3, any type of storage or memory device may be utilized to implement the prioritized storage function taught herein. Additionally, other types of storage management structures and techniques, such as the use of shift registers or a memory look-up table, may be used to implement the functionality of storing transaction information in a prioritized manner and provide the prioritized transaction information in accordance with predefined rules associated with each endpoint device. The bus protocol rules which are taught herein may be readily incorporated into existing bus protocols, such as the PCI protocol, for example, without creating problems for meeting the requirements of the PCI protocol. The illustrated embodiments may be implemented by using either single bit-wide conductors or multiple bit-wide conductors where conductors are not otherwise indicated to be multiple bit-wide. Preferably, all buses are implemented as multiple conductors. Therefore, it is intended that this invention encompass all such variations and modifications as fall within the scope of the appended claims.

What is claimed is:

1. In a multi-processing system having a first endpoint device coupled to a second endpoint device via an interconnect, a method for managing transaction transfers, comprising:

creating a priority system in both the first endpoint device and the second endpoint device for the exchange of transaction information in the system wherein: (1) requests for transaction information that require a response can never be issued at the highest priority; (2) no endpoint device may allow the acceptance of input transaction information to be contingent on outputting transaction information of equal or lesser priority than the input transaction information; (3) highest prioritized transaction information must be able to be serviced before lower prioritized transaction information when lower prioritized transactions can not make forward progress; and (4) for transaction information of a same priority level, transaction information is serviced on a first-in, first-out basis;

in the first endpoint device, implementing a request transaction of the second endpoint device;

transferring the request transaction from the first endpoint device to the second endpoint device via the interconnect; and in the second endpoint device, implementing the request from the first endpoint device.

2. The method of claim 1 further comprising:

implementing the interconnect as a circuit device, the circuit device having logic circuitry which: (1) communicates the input transaction information on a highest priority-first basis; and (2) communicates input transaction information of a same priority on a first-in, first-out (FIFO) basis.

3. The method of claim 1 wherein the step of implementing at the second endpoint device the request from the first endpoint device further comprises:

the second endpoint device responding by communicating a response to the first endpoint device.

4. The method of claim 1 further comprising:

implementing a first bus protocol in the first endpoint device; and implementing a second bus protocol in the second endpoint device, wherein the interconnect has no dedicated circuitry which is required to implement either the first bus protocol or the second bus protocol.

5. The method of claim 1 further comprising implementing the interconnect as a circuit device which does not have circuitry specifically dedicate to implement a predetermined bus protocol implemented in the first endpoint device.

6. The method of claim 1 further comprising implementing the interconnect as a system bus conductor to couple the first endpoint device to the second endpoint device.

7. The method of claim 1 further comprising implementing the first endpoint device as a data processor and implementing the second endpoint device as a memory controller.

8. The method of claim 1 further comprising coupling additional endpoint devices to the interconnect, each of which implements the priority system.

9. The method of claim 1 further comprising:

selectively bypassing servicing of transaction information on a first-in, first-out basis to avoid a deadlock condition in the multi-processing system by promoting a transaction priority to enable a promoted transaction in be serviced.

10. A multi-processing system comprising:

a first endpoint device having a first bus interface unit;

a second endpoint device having a second bus interface unit;

an interconnect for coupling the first endpoint device and the second endpoint device, wherein each of the first endpoint device and the second endpoint device comprise circuitry for creating a priority system for the exchange of transaction information in the system wherein: (1) requests for transaction information that require a response can never be issued at a highest priority; (2) neither the first endpoint device nor the second endpoint device may allow the acceptance of input transaction information to be contingent on outputting transaction information of equal or lesser priority than the input transaction information; (3) highest prioritized transaction information must be able to be serviced before lower prioritized transaction information when lower prioritized transactions can not make forward progress; and (4) for transaction information of a same priority level, transaction information is serviced on a first-in, first-out basis.

11. The multi-processing system of claim 10 wherein the interconnect is a circuit device, the circuit device having logic circuitry which: (1) communicates input transaction information on a highest priority-first basis; and (2) communicates input transaction information of a same priority on a first-in, first-out (FIFO) basis.

12. The multi-processing system of claim 10 further comprising:

a bypass mechanism in each of the first endpoint device and the second endpoint device for selectively bypassing servicing of transaction information on the first-in, first-out basis to avoid a deadlock condition in the multi-processing system by promoting a transaction priority to enable a promoted transaction to be serviced.

13. The multi-processing system of claim 11 wherein the interconnect is a multiple conductor bus.

14. The multi-processing system of claim 11 wherein the interconnect is a plurality of circuit devices, each of the circuit devices having logic circuitry which: (1) communicates input transaction information on a highest priority-first basis; and (2) communicates input transaction information of a same priority on a first-in, first-out (FIFO) basis.

15. The multi-processing system of claim 12 wherein the bypass mechanism further comprises logic circuitry for detecting a deadlock condition caused by inadequate storage to be able to service transaction information of a predetermined priority on the first-in, first-out basis and promoting the transaction priority by either raising a priority value of the transaction of the predetermined priority or by directly routing the transaction of the predetermined priority to the interconnect.

16. A system interconnect for ordering transactions between multiple processing elements, comprising:

an input for receiving data from a first of the multiple processing elements;

a bit parser having an input coupled to the input for receiving the data and selecting a predetermined number of bits from the data, the bit parser providing the predetermined number of bits to an output terminal;

priority decode logic having an input coupled to the output terminal of the bit parser, the priority decode logic analyzing the predetermined number of bits and determining a priority level assigned to the data which has been received, the priority decode logic providing a control signal which indicates the priority level;

a multiplexer having an input coupled to the input for receiving the data from the first of the multiple processing elements, the multiplexer having a control input for receiving the control signal and having a plurality of prioritized outputs, the multiplexer providing the data at a selected one of the plurality of prioritized outputs in response to the control signal;

a storage device coupled to the multiplexer for receiving the data from the multiplexer and storing the data in priority designated regions; and selection logic circuitry coupled to the storage device, the selection logic circuitry providing the data from the storage device at an output of the system interconnect by observing the rules of providing transactions on a highest priority first basis, and within a same priority on a first-in, first-out basis, wherein by observing the rules the system interconnect avoids transaction deadlocking of information transfers and properly prioritizes and orders transactions regardless of specific bus protocol functionality implemented by the multiple processing elements.

17. The system interconnect of claim 16 wherein the predetermined number of bits from the data is two.

18. The system interconnect of claim 16 further comprising a second of the multiple processing elements, the second of the multiple processing elements being based on a communication bus protocol which is different from the first of the multiple processing elements.

19. The system interconnect of claim 16 wherein the priority decode logic selectively bypasses servicing of transaction information on the first-in, first-out basis to avoid a deadlock condition in the storage device by promoting a transaction priority to enable a promoted transaction to be serviced.

20. The system interconnect of claim 19 wherein transaction information is selectively routed from the multiplexer to the output of the system interconnect to avoid a deadlock condition in the system interconnect due to a lack of storage capacity of the storage device.

* * * * *

UNITED STATES PATENT AND TRADEMARK OFFICE
CERTIFICATE OF CORRECTION

PATENT NO. : 6,678,773 B2
DATED : January 13, 2004
INVENTOR(S) : Marietta et al.

It is certified that error appears in the above-identified patent and that said Letters Patent is hereby corrected as shown below:

Column 9,
Line 60, change "transaction in" to -- transaction to --

Signed and Sealed this

Twenty-second Day of June, 2004

JON W. DUDAS
*Acting Director of the United States Patent and Trademark Office*